United States Patent [19]
Ogawa

[11] Patent Number: 4,811,145
[45] Date of Patent: Mar. 7, 1989

[54] HEAD DEVICE OF TAPE PLAYER
[75] Inventor: Hisashi Ogawa, Tokyo, Japan
[73] Assignee: Shinwa Kabushiki Kaisha, Tokyo, Japan
[21] Appl. No.: 100,026
[22] Filed: Sep. 23, 1987
[30] Foreign Application Priority Data
   Oct. 2, 1986 [JP] Japan .................. 61-152068
[51] Int. Cl.$^4$ .................. G11B 5/55; G11B 5/56; G11B 21/24
[52] U.S. Cl. .................. 360/109; 360/106
[58] Field of Search .................. 360/109, 106
[56] References Cited
   U.S. PATENT DOCUMENTS
   4,510,543  4/1985  Ohta et al. .................. 360/109

Primary Examiner—Robert S. Tupper
Attorney, Agent, or Firm—James E. Nilles; Donald C. McGaughey

[57] ABSTRACT

A head device of a tape player equipped with an autoreverse mechanism in which a head is shifted in the widthwise direction of a magnetic tape at the time of reverse mode so as to be shifted from the forward track to the reverse track. A head driving body having a forward supporting surface which supports at a forward position a head supporting body which is movably provided in the widthwise direction of the magnetic tape and having a reverse supporting surface which supports it at a reverse position is provided, and an adjusting screw which is in contact with the forward supporting surface of the head driving body and an adjusting screw which is in contact with the reverse supporting surface are provided in one of supporting body bearing portions of the head supporting body.

3 Claims, 1 Drawing Sheet

HEAD DEVICE OF TAPE PLAYER

BACKGROUND OF THE INVENTION

1. Field of the Invention

This invention relates to a head device for a tape player equipped with an autoreverse mechanism which allows a magnetic tape to playback in a reciprocating manner or to record and playback in a reciprocating manner, and in particular relates to a head device which is adapted to be shifted between a forward track and the rearward track by moving the head in the widthwise direction of the magnetic tape.

2. Description of the Prior Art

A head device which is adapted to be shifted between a forward track and a reverse track of a magnetic tape by shifting the head in the widthwise direction of the magnetic tape is exemplified by a device in which the head is secured to a head supporting body that is provided so as to be movable in the widthwise direction of the tape, and this head supporting body is adapted to be shifted to either the forward track or the reverse track of the magnetic tape.

Another head device is of a type in which a head is secured to a head supporting body in such a way that its angle with respect to the longitudinal direction of the magnetic tape can be adjusted to realize a head device which is capable of providing azimuth adjustment of the head with respect to the magnetic tape.

In head devices of a type in which the head is switched between a forward track and a reverse track by moving the head in widthwise direction of a magnetic tape, there is a head of a type in which azimuth adjustment of the head with respect to the tape can be realized. When azimuth adjustment of the head is realized at the forward track position of the head supporting body, however, the azimuth in the reverse direction deflects because of runout of position of a head supporting body when this head supporting body is shifted from forward track to the reverse track, in spite of the azimuth being correct when the head is positioned at the forward track, because the angle of the head with respect to the head supporting body is adjusted.

SUMMARY OF THE INVENTION

An object of the present invention is to overcome the above problem and to provide a head device of a tape player in which a head is adapted to be shifted between a forward track and a reverse track in widthwise direction of a magnetic tape at the time of reverse mode characterized by that azimuth adjustment can be realized in both forward direction and reverse direction.

The head device of a tape player equipped with an autoreverse mechanism according to the present invention is characterized by that the head is shifted at the time of reverse mode in the widthwise direction of the magnetic tape so as to shift from forward track to the reverse track. The device comprises a head supporting body which is movably provided in the widthwise direction of the magnetic tape, the aforesaid head being secured to a center portion thereof, and supporting body bearing portions provided on two ends thereof in such a manner that these portions project on two sides of the head. Further, it comprises a head driving body having a forward supporting surface which supports the head supporting body at a forward position, and a reverse supporting surface which supports it at the reverse position, each of which is in contact with each supporting body bearing portion provided at two ends of the head supporting body. Furthermore, it comprises an adjusting screw which is in contact with the forward supporting surface of the aforesaid head driving body for the purpose of adjusting the forward position and an adjusting screw which is in contact with the reverse supporting surface for the purpose of adjusting reverse position, which are provided in one of the supporting body bearing portions of the aforementioned head supporting body.

In this invention, the adjusting screw which is adapted to adjust a forward position is operated so as to shift one end of the head supporting body in the widthwise direction of the magnetic tape for the purpose of inclining the head, as a result of which azimuth between the head and the track in the forward direction of the magnetic tape is adjusted. On the other hand, the adjusting screw which is adapted to adjust a reverse position is operated so as to shift one end of head supporting body in the widthwise direction of the magnetic tape for the purpose of inclining the head, as a result of which azimuth between the head and the track in the reverse direction of the magnetic tape is adjusted.

BRIEF DESCRIPTION OF THE DRAWINGS

Further object and characteristics of the present invention will be made clear by the description with reference to the accompanying drawings.

DESCRIPTION OF THE PREFERRED EMBODIMENTS

Figure 1:
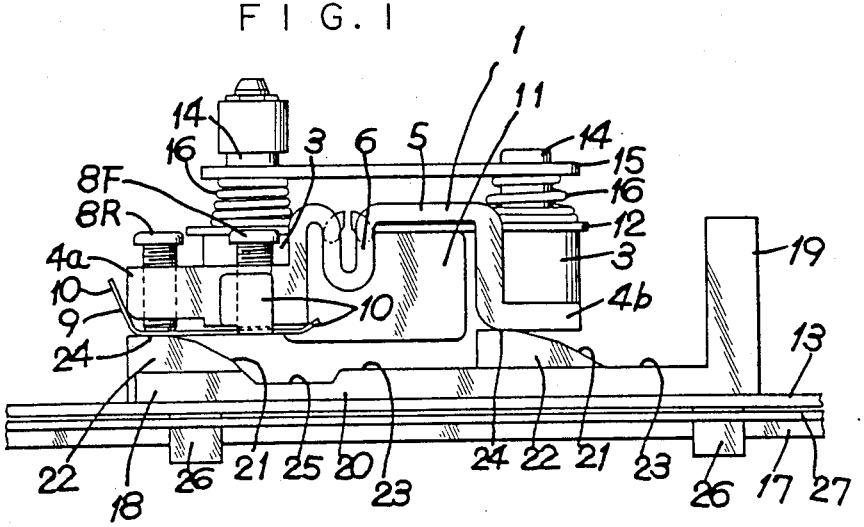
FIG. 1 is a side view illustrating one embodiment of a head device of a tape player according to the present invention in a reverse state.

Reference numeral 1 represents a head supporting body having a pair of bearing portions 3 and 3 provided symmetrically, and which are provided with vertical through holes 2 and supporting body bearing portions 4a and 4b which are provided in the lower portions of the bearing portions 3 and 3, and which are brought into contact with a hereinafter described head driving body 18. These supporting body bearing portions 4a and 4b are connected by a connecting portion 5. This connecting portion 5 is formed in a substantially U-shape, its opening facing side is provided between two supporting body bearing portions 4a and 4b, and a wiring supporting portion 6 formed in the substantially U-shape is provided on the upper portion of the former. And a pair of vertically penetrating tapped holes 7 and 7 are symmetrically provided in a parallel manner in one of the supporting body bearing portion 4a. An adjusting screw 8F for adjusting forward position is screwed in one of the tapped holes 7, and an adjusting screw 8R for adjusting reverse direction is screwed in the other tapped hole 7. An abutting plate 9 to which front ends of the adjusting screws 8F and 8R are abutted is arranged in the lower surface of the supporting body bearing portion 4a. A raising portion 10 which is in contact with the side surface of the supporting body bearing portion 4a is provided in the peripheral portion of the abutting plate 9. Plate 9 is secured to the head supporting body 1 and to a supporting shaft 14 in such a manner that body 1 and plate 9 are vertically movable relative to shaft 14.

A head mounting plate 12 to which a head 11 is secured to, the lower surface thereof is provided on the top surface of this head supporting body 1 between the bearing portions 3 and 3. Through holes which are omitted from illustration and corresponding to the positions of the through holes 2 and 2 are provided in this head mounting plate 12. A wiring omitted from illustration and extending from the head 11 is inserted into the wiring supporting portion 6.

This supporting body 1 (with the abutting plate 9 and the head mounting plate 12) is movable in the vertical direction with the bearing portions 3 and 3 along the supporting shafts 14 and 14 which are vertically provided on a movable chassis 13, that is, supported movably in the widthwise direction of the magnetic tape. And this body 1 is downwardly forced by means of springs 16 and 16 which are interposed between the aforesaid head mounting plate 12 and a spring mounting plate 15 which is secured to the top ends of the shafts 14 and 14. The movable chassis 13 is movable in the direction in which the head 11 is brought into contact with and separated from (back and forth direction in FIGS. 1 and 2) the magnetic tape with respect to a fixed chassis 17.

Reference numeral 18 represents a head driving body which is adapted to be movable in the lateral direction on the movable chassis 13, and which has a substantially L-shaped base portion 20 having a rising portion 19 at right end which is vertically provided. A pair of projections 22 and 22 having a slant surface 21 at right thereof are symmetrically provided in the parallel manner on the top surface of this base portion 20. The top surface of the base portion 20 to which each supporting body bearing portion 4a and 4b (the supporting body bearing portion 4a is in contact through each adjusting screw 8F or 8R and the abutting plate 9) abuts when head driving body 18 is shifted left (position shown in FIG. 2) constitutes a forward supporting surface means 23 and 23. And the top surfaces of the projections 22 and 22 to which each supporting body bearing portions 4a and 4b of the head supporting body 1 abuts constitutes a reverse supporting surface means 24 and 24 when the head driving body 18 is shifted right (position shown in FIG. 1). A recess 25 for keeping clearance from the tip of the adjusting screw 8R is provided in the top surface of the base portion 20 adjacent to the left projection 22. In this head driving body 18, a pair of bearing portions 26 and 26 which project from the bottom surface of the base portion 20 are laterally movably provided for the movable chassis 13 and the fixed chassis 17 (inserted into grooves which are laterally provided in each chassis 13 and 17). A switch plate 27 which is provided between the movable chassis 13 and the fixed chassis 17 is connected and fixed to the bearing portions 26 and 26. The head driving body 18 is adapted to be laterally moved on the movable chassis 13 in accordance with the shift of the switching plate 27 in the lateral direction.

The operation of the embodiment will now be described.

Figure 2:
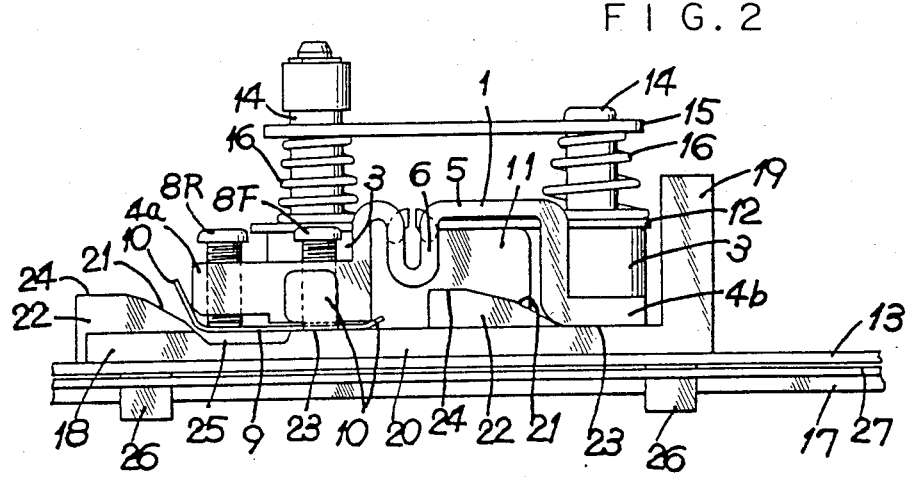
FIG. 2 is a side view in a forward state.
Figure 3:
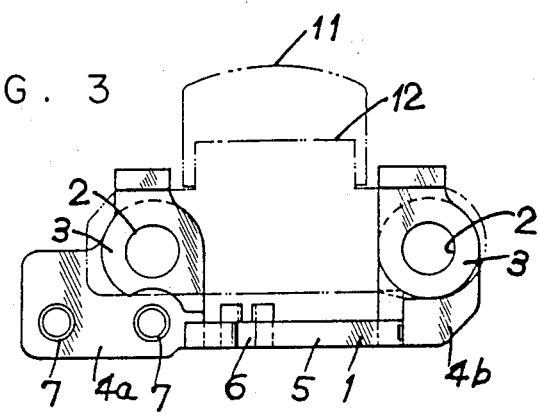
FIG. 3 is a partial plan view.

At the time of forward mode, as shown in FIG. 2, the head driving body 18 is shifted left, and the supporting body bearing portions 4a and 4b are abutted against the forward supporting surfaces 23 and 23 of the head driving body 18 so as to position the head supporting body 1 at the forward position, and the head 11 is therefore positioned on the track in registry with the forward track.

The length of projection of the adjusting screw 8F between the tip and the bottom surface of the supporting body bearing portion 4a is adjusted by turning the adjusting screw 8F at the forward position for the purpose of shifting the one end of the head supporting body 1 vertically, that is in the widthwise direction of the magnetic tape so as to incline the head 11. As a result of this, azimuth between the head 11 and the forward track of the magnetic tape can be adjusted.

Since the tip of the adjusting screw 8R is faced to the recess 25 for keeping clearance, the adjusting screw 8R does not affect the forward position of the head supporting body 1.

At the time of reverse mode, as shown in FIG. 1, the head driving body 18 is shifted right so as to make the supporting body bearing portions 4a and 4b of the head supporting body 1 mount on the two projections 22 and 22. And the supporting body bearing portions 4a and 4b are in contact with the reverse supporting surfaces 24 and 24 of the head driving body 18 to position the head supporting body 1 at the reverse position, and the head 11 is positioned in accordance with the reverse track of the magnetic tape.

By turning the adjusting screw 8R at this reverse position so as to adjust the length of the tip projected from the bottom surface of the supporting body bearing portions 4a, one end of the head supporting body 1 is vertically moved, that is, in the widthwise direction of the magnetic tape so as to incline the head 11, as a result of this, azimuth adjustment between the head 11 and the reverse track of the magnetic tape can be realized. Since the tip of the adjusting screw 8F does not hit the reverse supporting surface 24, the adjusting screw 8F does not affect the reverse position of the head supporting body 1.

Therefore, azimuth adjustment between the head 11 and the forward track and the reverse track can be realized at both forward position and reverse position.

In the head device whose head is shifted in the widthwise direction of the magnetic tape so as to shift between the forward track and the reverse track at the time of reverse mode, by adjusting each adjusting screw for adjusting forward direction and reverse direction which are provided in the supporting body bearing portion of the head supporting body, one end of the head supporting body is shifted in the widthwise direction of the magnetic tape so as to incline the head, as a result of this, azimuth adjustment between the head and the forward track and the reverse track of the magnetic tape can be adjusted.

I claim:

1. A head device for a tape player equipped with an autoreverse mechanism which allows a magnetic tape having forward and reverse tracks to record and play back in a reciprocating manner, said head device including a head supporting body, means mounting said head supporting body on a chassis of said tape player for shifting only in the widthwise direction of said tape and a head mounted on said head supporting body for movement into registry with either said forward track or said reverse track on said tape in response to shifting of said head supporting body in said widthwise direction, wherein the improvement comprises:

said head supporting body having a head mounting portion on which said head is mounted and supporting portions which project from said head mounting portion;

a head driving body having forward supporting surface means, and reverse supporting surface means spaced apart from each other in said widthwise direction of said tape which are alternatively engageable in supporting relation with said supporting portions of said head supporting body;

means mounting said head driving body on said tape player chassis for reciprocal movement in directions transverse to said widthwise direction of said tape to alternatively cause said forward and reverse supporting surface means to contact said supporting portions to move said head supporting body between a forward tape track position and a reverse tape track position;

a forward adjusting screw adjustably mounted in said head supporting body and engageable only with said forward supporting surface means when said head driving body is in said forward tape track position, and a reverse adjusting screw adjustably mounted in said head supporting body and engageable only with said reverse supporting surface means when said head driving body is in said reverse tape track position;

whereby each of the azimuth adjustments of said head to said forward track and said reverse track is permitted independently.

2. The head device of a tape player according to claim 1, wherein said head driving body has a top surface, and a recess in said top surface in registry with a tip of one of said screws to provide clearance between the tip of one of said adjusting screws and said supporting surface means when the tip of the other of said adjusting screws is brought into contact with one of said supporting surface means.

3. The head device of a tape player according to claim 1, wherein said head supporting body has ends spaced apart from each other in the direction of travel of said tape and wherein said forward and reverse adjusting screws are adjustably mounted in one of said supporting body ends to shift one end of said head supporting body in the widthwise direction of the magnetic tape for the purpose of inclining the head so as to independently adjust an azimuth between the head and the track for both forward and reverse directions of the magnetic tape.

* * * * *